United States Patent [19]

Ryan

[11] Patent Number: 4,629,546
[45] Date of Patent: Dec. 16, 1986

[54] METHOD AND APPARATUS FOR CENTRIFUGAL SEPARATION OF DISPERSED PHASE FROM A CONTINUOUS LIQUID PHASE

[75] Inventor: Douglas G. Ryan, Rockaway, N.J.

[73] Assignee: Exxon Research and Engineering Company, Florham Park, N.J.

[21] Appl. No.: 722,164

[22] Filed: Apr. 11, 1985

[51] Int. Cl.[4] ............................ B03C 5/00; B04B 5/10
[52] U.S. Cl. .................................... 204/188; 204/186; 204/302
[58] Field of Search ....................... 204/186, 188, 302; 55/10; 210/748, 243

[56] References Cited

U.S. PATENT DOCUMENTS

| | | | |
|---|---|---|---|
| 3,412,002 | 11/1968 | Hubby | 204/181.8 |
| 3,489,669 | 1/1970 | Ruhnke | 204/302 |
| 3,567,619 | 3/1971 | Brown | 204/188 |
| 3,616,460 | 10/1971 | Watson | 204/302 |
| 4,193,774 | 3/1980 | Pilot | 55/10 |
| 4,435,261 | 3/1984 | Mintz et al. | 204/168 |

Primary Examiner—Howard S. Williams

[57] ABSTRACT

In solvent de-waxing of lube oil, a stream (3) of chilled waxy oil and solvent is introduced into a centrifugal separation device (2) which separates a quantity of wax from the waxy oil and solvent. The dewaxed oil (DWO) and solvent leaving the centrifuge (2) contains a small proportion of wax fines. By introducing free excess charge which is net unipolar into the stream (3), for example by injecting the charge into a stream (9) of cold solvent introduced into stream (3), enhanced deposit of wax on the centrifuge bowl is achieved, thereby substantially removing the wax fines from the dewaxed oil (DWO) and solvent. Alternatively, a bead separator (22), itself employing charge injection with a charge injection (26) for enhanced wax separation, is used for substantially removing the wax fines in the dewaxed oil and solvent from the centrifugal separation device (2). Preferably, both introduction of free excess charge into the stream (3) admitted to the centrifugal separation device (2) and a bead separator (22) are employed, which can lead to higher throughput in the equipment with minimal wax content of the dewaxed oil and solvent leaving the bead separator.

38 Claims, 2 Drawing Figures

METHOD AND APPARATUS FOR CENTRIFUGAL SEPARATION OF DISPERSED PHASE FROM A CONTINUOUS LIQUID PHASE

BACKGROUND OF THE INVENTION

This invention relates to a method and apparatus for centrifugal separation of a dispersed phase from a continuous liquid phase. "Dispersed phase" in this specification means a dispersed solid or liquid phase. More particularly, though not exclusively, this invention relates to the removal of wax particles from a hydrocarbon oil mixture boiling in the lubricating oil range. The term "wax particles" herein means wax in any particulate form and includes wax crystals. Furthermore, throughout this specification, it is to be understood that "hydrocarbon oil mixture" and "oil mixture" both mean a hydrocarbon oil mixture boiling in the lubricating oil range.

The problems of wax in lubricating oil are very well known in the art. In the distillation of crude oil, a proportion of wax is present in cuts taken in the lubricating oil range. Some of the wax remains dissolved in the oil whereas other fractions form a haze as the oil fraction ages at ambient temperatures or below. Wax in itself is in fact a good lubricant but under comparatively low temperatures such as engine cold start conditions, its presence causes the oil to be thick and viscous and as a result the engine may be hard to turn over at sufficient speed during starting. Typically, a minimum of about 0.1% by volume of wax will cause some lubricating oils to look hazy. Therefore, the existence of haze caused by the presence of wax crystals or particles detrimentally affects the performance of lubricating oils. It is of paramount practical importance to devise techniques for removing wax haze from lubricating oil in a relatively inexpensive, simple and effective manner, which techniques are also capable of implementation on an industrial scale. It is also of importance to separate dispersed phases from continuous liquid phases, generally.

DESCRIPTION OF THE PRIOR ART

Solvent de-waxing techniques for lube oil (hydrocarbon oil mixture boiling in the lubricating oil range) are well known in the art in which an oil solvent is added to the lube oil. "Oil solvent" as used throughout this specification refers to those solvents which when added to an oil mixture result in a lower viscosity for the solvent-oil mixture than for the oil mixture alone. This is beneficial for enhancing the settling or filtration processes used to separate the precipitated wax from the solvent oil mixture. Usually, the oil solvent will have the additional property of having a higher solubility for the oil mixture than for the wax at a given temperature, so that during chilling of the solvent-oil mixture to precipitate wax, the wax precipitation is enhanced.

Precipitated wax particles or crystals are commonly separated from the lube oil/solvent mixture by filtration, typically in a rotary filter device which results in a deposit or "cake" of wax being formed on a filter cloth stretched around the filter drum periphery. This wax cake is a "wet" cake containing relatively large amounts of solvent and lube oil in addition to the collected wax. The solvent present represents a loss which has to be made up while the oil trapped in the cake represents a reduction in potential yield.

One known method of overcoming these limitations is the use of a centrifuge which separates wax from the solvent/oil mixture. In one form, the centrifuge comprises a centrifuge bowl which is rotated at high speed and thereby induces high speed swirl of lube oil-solvent mixture introduced into the centrifuge at the bottom. Because the wax particles have a higher density than the lube oil and solvent, the wax particles are urged under centrifugal force against the inside surface of the centrifuge bowl and deposit on the exposed inner surface of the centrifuge bowl. A screw conveyor driven at a different speed from the centrifuge bowl scrapes deposited wax from the bowl surface and conveys the wax to a lower region of the centrifuge where it is withdrawn, together with oil-solvent mixture. The swirling lube oil-solvent mixture in the upper region of the centrifuge contains relatively little wax and overflows a weir to be withdrawn along a line for dewaxed oil and solvent. Centrifuges provide "drier" wax cakes (i.e. lower solvent and oil content) than filter cakes. However, the centrifuge overflow at the weir is seldom completely wax-free. Trace amounts of fine wax crystals usually escape, entrained by the weir overflow. The wax contaminated overflow cannot be accepted as such because the wax strongly affects the cloud point of the dewaxed oil constituting the centrifuge weir overflow. To meet this limitation, the centrifuge capacity has to be restricted sufficiently and this in turn can render the centrifuge uneconomical or at least result in reduction in the overall capacity of the apparatus.

It is known in the art to employ electrical treatment in combination with centrifugal separation, for removal of wax from lube oil. In U.S. Pat. No. 2,151,318 (Dillon et al), a lube oil dewaxing process is disclosed, comprising adding a dewaxing solvent and then chilling to precipitate the wax. The partially dewaxed oil is subjected in an electrical treating chamber to an electrical field between the treater wall and a central electrode therein. The electrical treatment of the precipitated wax renders it more readily filtered and centrifuged. When it is desired to centrifuge the solution, the solution is allowed to flow through a centrifuge and wax is removed from the centrifuge through a wax line.

Similar apparatus is disclosed in U.S. Pat. Nos. 2,039,636 and 2,174,938 (both Dillon et al) which disclose mixing an oil with a dewaxing solvent and chilling to precipitate the wax in the oil and separate some of the wax. The oil containing the remaining wax is sent to a filter press. The Dillon et al patents mention that a centrifuge may be substituted for the press.

It is pointed out that, in contra-distinction to the present invention, none of the three Dillon et al patents referred to above discloses the use of introduction of net unipolar free excess charge into the lube oil to promote wax separation.

U.S. Pat. No. 4,341,617 (King) is of some interest. This discloses the use of sharply pointed projections on one electrode of a pair of oppositely charged electrodes associated with a treating chamber in an electrostatic treater for waste liquid to be discharged into municipal sewage systems, to concentrate the electric field at the projection tips for encouraging flocculation of impurity particles carried by the waste liquid. In another arrangement, the projection tips inject charge carriers into the waste liquid and a resulting electrical current flow is established through the waste liquid between the two electrodes. The net positive charge due to the flow of positive ions in one direction exactly equals the net negative charge due to the flow of negative ions in the opposite direction. King does not mention any application to separating wax from lube oil, nor it does it mention at all the use of centrifugal separation.

Reference is also direction to U.S. Pat. No. 3,324,026 (Waterman et al) which again does not mention centrifugal separation. Waterman discloses an electric filler for removing suspended contaminants from substantially water-free, high resistivity oils. The contaminated oil is flowed through the pores of individual elements of porous material forming a multi-element mass filling a treating space between two electrodes which maintain a high-gradient unidirectional electric field in the treating space. Before the oil is passed through the multi-element mass, it may be subjected to electrical discharge or blast action by a plurality of relatively sharp pointed pins of one polarity facing but spared from a member of opposite polarity.

It is also known from U.S. Pat. No. 4,255,777 (Kelly), assigned to the present assignees, to inject charge into a liquid. This patent specifically discloses an electrostatic atomizing device and process for the formation of electrostatically charged droplets having an average diameter of less than about 1 millimeter for a liquid having a low electrical conductivity. Envisaged applications of the electrostatic atomizing technique are for spraying cleaning fluid onto the surface of an article to be cleaned, for spraying agricultural liquid, such as an insecticide, onto vegetation or soil, for spraying lubricant onto bearings and gears of large industrial machinery, for surface coating an article by spraying a solution of a plastic dissolved in a non-conductive liquid or an oil-based paint, to inject free excess charge into a molten plastic, glass or ceramic, and for spraying liquified plastic material for forming surface coatings. Another possible application is to produce charged droplets of liquid e.g. paint within a body of the same liquid which is in contact with a metal surface, so that the charged droplets deposit as a coating on the metal surface. Charged droplets of for example perfume could by sprayed onto oppositely charged powder e.g. talcum powder. Yet another application is the atomization of hydrocarbon fuels, for increasing combustion efficiency. However, the Kelly patent neither discloses nor suggests trying to charge a two-phase liquid comprising dispersed or suspended droplets or particles in a continuous liquid phase (such as wax particles in lubricating oil), nor appreciates that the charge, introduced into the continuous liquid phase, transfers therefrom to the dispersed phase and that an electrophoretic effect occurs which causes migration of the dispersed phase in the continuous liquid phase, nor even suggests any kind of application to electrical separation.

Finally reference is directed to U.S. Pat. No. 4,435,261 (Mintz et al), assigned to the present assignees, which discloses a technique for the free radical polymerization of liquid monomers into thermoplastic polymers. Free excess electrical charge in injected into the liquid monomer, so as to initiate polymerization of the monomer into a polymer.

SUMMARY OF THE INVENTION

The present invention is concerned generally with separation of a dispersed phase from a continuous liquid phase. The invention is particularly concerned with the removal of wax particles from a hydrocarbon oil mixture boiling in the lubricating oil range, but is not restricted thereto.

The present invention requires that the continuous phase in centrifuged in a centrifugal separation device. Throughout this specification, "centrifugal separation device" will include not only centrifuges having a rotor member which rotates at high speed so as to generate centrifugal force which acts on the waxcontaining lube oil so as to bring about a separation of the two phases, but also includes hydrocyclones in which a high speed flow of the continuous phase to be treated is introduced, tangentially, into a cyclone chamber which directs the incoming tangential high speed flow into a swirling flow within the cyclone chamber, again producing separation of the dispersed phase from the continuous phase due to centrifugal force. The invention also requires that free excess charge which is net unipolar is introduced into the continuous phase. The free charge introduction can be such that the continuous phase which is centrifuged is charged by introducing the free excess charge into the continuous phase either in the centrifugal separation device itself or before the continuous phase enters the centrifugal separation device. The individual charges tend to remain within the continuous phase until they encounter dispersed phase, whereupon the charge tranfers to the dispersed phase. The introduced free excess charge also causes an electric field to be induced in the centrifugal separation device. Charged dispersed phase is urged by centrifugal force against internal surface regions of the centrifugal separation device, and collects there. The inventor has found that because the dispersed phase is charged with free excess charge, enhanced separation occurs in the centrifugal separation device. This result may be at least partially attributable to the electrophoretic interaction which occurs between the induced field and the charged dispersed phase. Where the dispersed phase comprises particles, the charge on the particles causes them to be more positively held onto the internal surface regions and united with one another, with reduced tendency to particles breaking away and becoming re-entrained in the swirling, continuous phase. Where the dispersed phase comprises liquid droplets, the introduced free excess charge enhances coalescence of dispersed phase droplets collecting, under centrifugal force, in a common region to form larger droplets which in turn coalesce further to form a continuous film or body of liquid which can then be removed from the centrifugal separation device.

As an alternative to introducing free excess charge into the continuous phase so that the continuous phase which is centrifuged is charged, it is possible not to introduce free excess charge into the continuous phase either in the centrifugal separation device itself or upstream thereof, but to accept accordingly a proportion of dispersed phase which is not removed from the continuous phase in the centrifugal separation. Then, instead, that dispersed phase is separated using a separation device employing introduction of free excess charge which is net unipolar to bring about the required separation. A preferred such separator comprises a container vessel having an inlet for continuous phase from the centrifugal separation device and an outlet for clarified continuous phase, the vessel containing at least one internal collector surface, preferably in the form of a bed of densely packed beads of low electrical conductivity whose outer surfaces provide the collector surfaces. The introduced free excess charge transfers to the dispersed phase, in the same manner as described above in connection with introducing free excess charge into the continuous phase which is subjected to centrifugation in the centrifugal separation device. While the introduced charge is transferring to the dispersed phase, an electric field is being induced, due to the charge transfer, and this induced field interacts with the charged dispersed phase to cause charged dispersed phase to tend to migrate to the collector surfaces and accumulate there. In the case of a solid dispersed phase, the solid particles deposit on the collector surfaces which then periodically have to be regenerated, cleaned or replaced, according to techniques well known in the art. In the case of a dispersed liquid phase, the liquid droplets tend to agglomerate and coalesce on the collector surfaces and grow in size until they tend to separate from the collector surfaces as considerably enlarged droplets which then can be separated from the continuous phase according to known settling techniques.

Alternatively or in addition, a wax separation device of the construction described in the preceeding paragraph can be provided for separating dispersed phase from the continuous phase before the continuous phase is centrifuged. Instead of this wax separation device, an electrical treater, employing free excess charge introduction, can be used to produce dispersed phase agglomerates or grown droplets, which are then more readily separated by the centrifugal separation device.

It is to be understood that according to a preferred embodiment, the centrifuged continuous phase is itself charged with free excess charge, and also an electrical separator, employing introduction of free excess charge, is provided for removing any remaining dispersed phase in the continuous phase leaving the centrifugal separation device. In this way, especially enhanced separation of dispersed phase from the continuous phase can be achieved, or, alternatively, for an acceptable level of dispersed phase content in the final continuous phase, the overall throughput is significantly increased.

It will be appreciated that in either arrangement as referred to above, free excess charge is introduced into the continuous phase, whereby charge transfers to dispersed phase in the continuous phase and charged dispersed phase is collected, for separation from the continuous phase. Free excess charge introduced into the continuous phase is positive or negative ions which, initially, are free to move through the continuous phase. The continuous phase acts as a medium through which volumetric distribution of the introduced charge occurs, so as to establish the induced field. In the former arrangement referred to above, the dispersed phase is collected on internal surface areas of the centrifugal separation device, whereas in the second arrangement, because the charge is introduced into the relatively clarified continuous phase from the centrifugal separation device, the charged dispersed phase needs to be collected separately of the centrifugal separation device, at the downstream location of the electrical separator.

In regard to the introduction of free excess charge, several techniques are available to produce a transient or steady-excess charge density. Broadly speaking, such methods fall into two general categories, namely: (1) injection of excess charge across the interface or boundary which confines the continuous phase, and (2) volumetric charge introduction techniques into the bulk of the continuous phase. Examples of the first category include electron beam and high energy particle radiation, photo-emission and charge transport by a moving fluid. Reference is hereby directed to the aforesaid Kelly U.S. Pat. No. 4,255,777, the contents of which are expressly incorporated herein, for a description of one example of how charge injection can be achieved. Examples of the second category are photoionization of either or both of the continuous phase and dispersed phase and secondary ionization by thermalization of high energy particle irradiation of the continuous phase. It is necessary that there be an excess of free charge in the sense of a sufficient abundance that separation of the dispersed phase is promoted. Typically, the density of the free charge would be of the order of $10^{16}$ charges per $m^3$. A lower limit would be about $1 \times 10^{10}$ charges per $m^3$. A typical preferred range of free charge density is about $1 \times 10^{13}$ to $1 \times 10^{19}$ charged per $m^3$ or even higher, for providing effective enhanced separation of the dispersed phase.

The charge introduced into the continuous phase to be treated must be net negative or net positive. However, providing this requirement is met, then it is equally possible to introduce the excess charge using two streams of the same dispersed phase of opposite but unequal levels of charge or alternating net positive and net negative streams.

It is stressed that the electric field is not an applied field resulting from the application of voltage between a pair of electrodes, but rather arises from the total introduced or injected charge distribution in the continuous phase. The basis for the improved separation of wax which is achievable with the present invention is believed by the inventor to be as follows. Once free excess charge which is net unipolar has been introduced into the continuous phase, the next step in the process is the transference of the major portion of the excess charge to the dispersed phase in the continuous phase. It is assumed that the excess charge density exceeds the background charge density of the continuous phase (i.e. the density of bipolar charge carriers which are intrinsic to the continuous phase and which result in its conductivity); then, the induced electric field which arises in the continuous phase due to the excess charge density will act on the individual charge carriers and drive them to the boundaries of the continuous phase. Some of the charge will be intercepted by the dispersed phase which will thereby become charged. The interaction which then occurs between the charged dispersed phase and the induced electric field causes the dispersed phase to tend to migrate towards the boundaries of the continuous phase. In the case of the downstream electrical separator including a bed of densely packed beads or other collector surfaces, the migrating dispersed phase will collect on the collector surfaces and either coalesce (in the case of liquid droplets) or agglomerate to form a deposit on the surfaces (in the case of solid particles). Where the centrifuged continuous phase is itself charged, then the dispersed phase will be forcibly urged, by centrifugal force, against internal collector surfaces of the centrifugal separation device, leading to agglomeration or coalescence in a similar manner to that occurring in connection with the bead separator.

In order to achieve high injected charge densities when charge injection is employed, it is preferred that charge be injected into a stream of continuous phase which travels at sufficently high velocity through a small diameter orifice so as effectively to sweep the injected electrons downstream and electrically decouple the charged continuous phase downstream of the charge injector from the region of charge injection itself. The charged stream passes through a gas or vapor space which, preferably, is devoid of air, so as to avoid risk of explosion or chemical reaction. This gas or vapor space can be filled by vapor from a vaporizable oil solvent. Alternatively, a purge gas, such as nitrogen, can be circulated through the gas or vapor space. Providing the stream velocity exceeds the drift velocity of the charge carriers in the continuous phase, then a high density of charge carriers can be accumulated within the continuous phase, so as to lead to effective separation of the dispersed phase.

As already mentioned, a particularly preferred application of the invention is the separation of wax particles from lube oil. In this particular case, in order to promote precipitation of dissolved wax present in the lube oil alone or in combination with wax particles, an oil solvent can be added to the lube oil which is chilled before it is centrifuged. Especially conveniently, an oil solvent is used which additionally has the property that it is vaporizable, so that it will vaporize, for example in a flash chamber upstream of the centrifugal separation device and/or in the separation device itself, so as to contribute wholly or totally to the cooling of the waxy lube oil. It is preferred that the oil solvent be any liquid alkane or alkene whose molecular weight is between 16 and 114, or any other oil solvent whose electrical conductivity is less than about $10^{-8}$ (ohm. m)$^{-1}$.

BRIEF DESCRIPTION OF THE DRAWINGS

For a better understanding of the invention and to show how the same may be carried into effect, reference will now be made, by way of example, to the accompanying drawings, wherein.

DETAILED DESCRIPTION OF THE PREFERRED EMBODIMENTS

Figure 1:
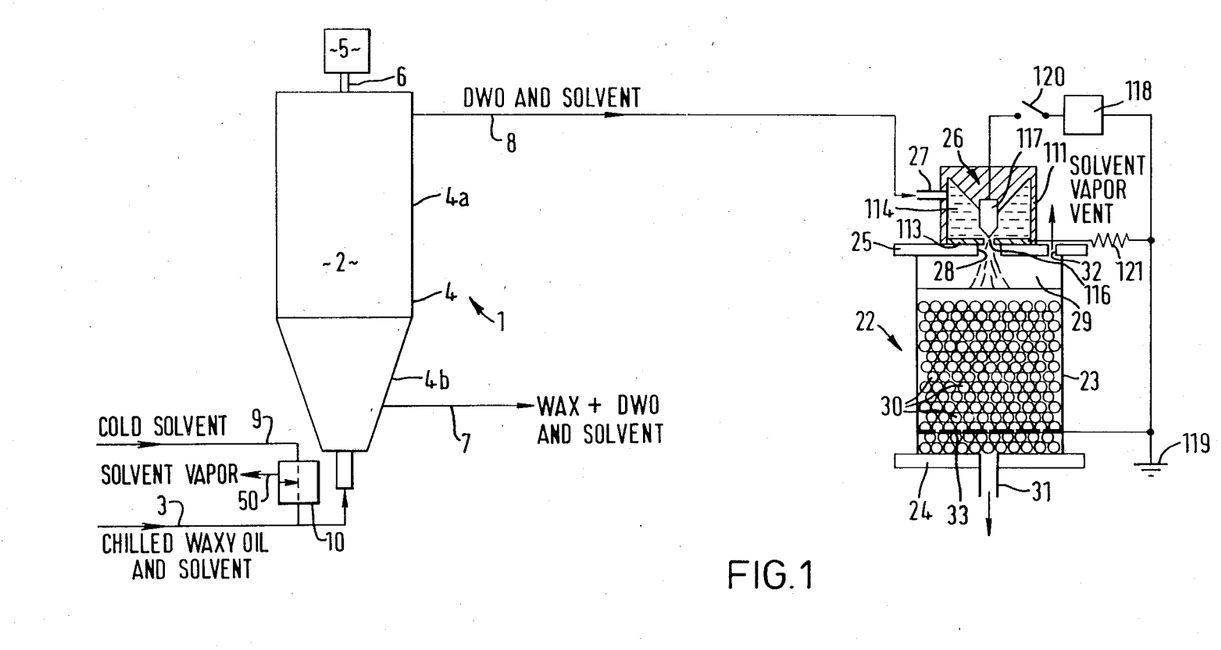
FIG. 1 is a diagrammatic view of one embodiment of the invention, for solvent removal of wax from lubricating oil using a centrifuge.

Referring to FIG. 1, there is shown, very diagrammatically, wax separation apparatus 1 including a centrifuge 2 which separates the major proportion of the wax content from the wax-laden lube oil. In order for the centrifuge 2 to operate effectively, it is necessary for the wax in the lube oil to be present predominantly or exclusively in the form of crystals or particles since dissolved wax cannot effectively be removed by centrifuging. However, in this example, the wax-bearing lube oil to be treated will initially be at a temperature at which much of the wax in the lube oil is disolved. In order to bring about precipitation of the dissolved wax in the lube oil so that it can then be separated by the centrifuge 2, an oil solvent is preferably added to the wax-laden lube oil feed and the feed is chilled, and then the chilled waxy oil and solvent feed is conveyed in line 3 to the centrifuge 2. The solvent has the property that it dissolves the oil preferentially and this enhances wax precipitation during chilling of the solvent-lube oil to precipitate wax. The solvent can be a vaporizable liquid which is allowed to vaporize, for example initially in a flash drum (not shown) upstream of line 3 and then again in the centrifuge 2 itself, so as to cool the lube oil/solvent mixture, such cooling also helping to assist the precipitation of dissolved wax. Such cooling can contribute wholly or in part to the overall required cooling of the lube oil. In the latter case, the further cooling can be provided by indirect heat exchange with a cooling medium in a heat exchanger (also not shown). One preferred such vaporizable solvent is propane which is widely used in the lube oil dewaxing art. Alternatively, the solvent need not be a liquid which is vaporizable under the operating conditions of the wax separation apparatus 1, in which case the necessary cooling will in generaly be achieved by indirect heat exchange with a cooling medium, as referred to above. An example of a preferred non-vaporizable solvent is hexane.

Additionally, in order to optimise the precipitation of the wax, the initial temperatures of the wax-bearing lube oil feed and the added solvent have to be such as to ensure that the lube oil is completely dissolved in the solvent. For example, where the solvent is liquified propane, the waxy oil feed temperature should be 130° F.± about 40° F. and the propane temperature is 130° F.± about 70° F. It is to be understood that the temperature ranges given are exemplary and have no limiting character. As a result of solvent addition to the waxy lube oil and chilling to a sufficiently low temperature (e.g. about −30° F.), the wax in the chilled oil feed plus solvent in line 3 is present in the form of solid wax particles or crystals.

The feed of waxy oil and solvent conveyed along line 3 is introduced into the centrifuge 2, which is arranged in an upright disposition, through an axial inlet at the bottom of the centrifuge. Dewaxing centrifuges are well known in the art and need not be described in any great detail herein. However, briefly, the centrifuge comprises an upright case 4 comprising an upper, cylindrical main section 4a and a lower, tapered or frustroconical section 4b whose cross-sectional area progressively reduces at increasing axial depths in the tapered section 4b. Inside the casing is a centrifuge bowl which can be rotated at high speed about the upright axis of the centrifuge casing 4 by a motor unit 5 which is coupled to the centrifuge bowl by drive shaft 6. The centrifuge bowl is rotated at high speed and it acts on the axial inlet flow of chilled waxy oil and solvent at the bottom of the centrifuge and causes it to swirl rapidly about the axis of the centrifuge casing. This high speed rotational swirl causes the higher density wax particles to be centrifuged into contact with the inside surface of the centrifuge bowl and deposit there to form a wax cake. The space within the rotating bowl contains a quantity of swirling lube oil and solvent, of which the wax content decreases in the upward direction, leaving relatively clarified lube oil and solvent at the top containing a small quantity of wax fines. A weir is provided at the top of the centrifuge and the dewaxed lube oil (DWO) and solvent overflowing the weir is withdrawn from the top of the centrifuge casing along line 8. Mounted centrally within the centrifuge bowl is an elongate screw conveyor which is arranged coaxially with, and drivably coupled through a step down transmission, to drive shaft 6 and with its screw blade in close proximity with the inside surface of the centrifuge bowl, so that when it is rotated by motor 5 at a different speed from the centrifuge bowl, the screw blade continuously scrapes deposited wax from the inside surface of the bowl and discharges it, together with relatively clarified lube oil and solvent containing a small quantity of wax fines, along line 7 from the bottom section 4b of the centrifuge casing. Line 7 conveys the wax and oil/solvent to a solvent recovery unit (not shown). To the extent described above, the separation of the wax from the lube oil is conventional. However, unlike conventional wax separation techniques, the wax separation apparatus 1 additionally includes novel means for achieving improved wax separation. These means will now be described.

Figure 2:
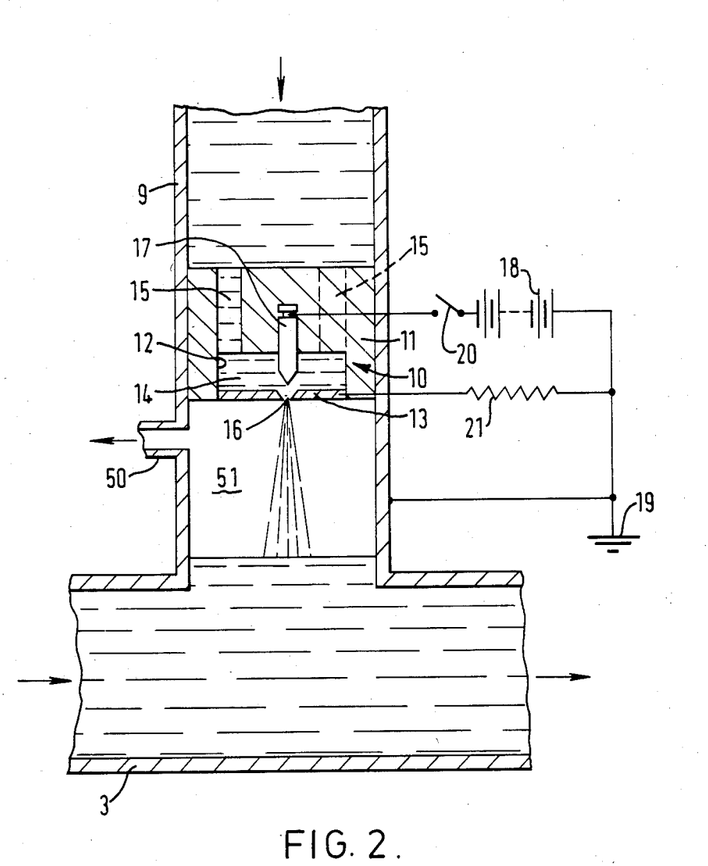
FIG. 2 is a vertical sectional view through a charge injector incorporated in the wax removal apparatus of FIG. 1.

As shown in FIG. 1, a stream of cold solvent, which is the same solvent as that flowing in line 3, is introduced, along line 9, into the chilled waxy oil and solvent feed in line 3, beofre the feed enters the inlet of centrifuge 2. The temperature of the cold solvent stream should be low enough such that when it mixes with the chilled waxy oil and solvent feed in line 3, the wax remains as a preciptate or suspension in the oil/solvent flow. By way of example, in propane dewaxing, the relative proportions by volume of propane, lube oil and wax upstream of the point where line 9 debouches into line 3 might be 15:8:2 while the relative proportion by volume of added cold solvent is 2. Arranged in line 9 is a charge injector 10 whose construction is shown in FIG. 2. The charge injector injects free excess charge which is net unipolar (net positive or net negative) into the cold solvent. The cold solvent accordingly acts as a carrier of free excess charge which, on mixing with the chilled waxy oil and solvent flowing in line 3, surrenders the charge to wax particles in the oil/solvent stream, whereby these wax particles become charged.

Referring now to FIG. 2, the portion of line 9 connected to horizontally arranged line 3 is vertically disposed. The charge injector 10 comprises a body 11 of cylindrical shape which is mounted in any convenient way inside vertical portion of line 9 so that a fluid-tight seal is formed between the body 11 and the inside surface of line 9. The flow direction through line 9 is indicated by arrow. The body 11 comprises a cylindrical block of electrically insulative material in which a blind cylindrical recess 12 is formed at the downstream side of the block. The blind recess is closed off in line with the downstream end face of cylindrical block 11 by a circular, electrically conductive plate 13, to define an enclosed space or chamber 14 within the charge injector body. This enclosed space communicates by means of a plurality of axial passageways 15, drilled in cylindrical block 11, with the section of line 9 which is upstream of the charge injector body. The conductive plate 13 is formed with a central orifice 16. Therefore, solvent in line 9 enters the charge injector body through the axial passageways 15, and flows through enclosed space 14, leaving the charge injector via central orifice 16.

A high voltage electrode 17 is firmly embedded in the material of the charge injector body 11 and projects into enclosed space 14. As shown, the projecting end of the electrode comprises a pointed tip which is positioned close to, and in axial alignment with, the central orifice 16 in conductive plate 13. High voltage electrode 17 is connected, through an on-off switch 20, to the high potential side of a high voltage source 18 which is connected to earth at 19. Conductive plate 13 acts as a relatively low voltage electrode and is connected to ground 19, either directly or, as shown, through resistance element 21. The wall of line 9 may be made of electrically conductive material and connected to earth as shown, so as to complete the electrical circuit of the charge injector. Alternatively, a grid electrode, connected to earth, may be positioned inside line 9 at a location downstream of the charge injector 10.

Another possibility is for the centrifuge bowl to be connected to earth. When the switch 20 is closed, the electrode pair 13, 17 injects charge, through the tip of high voltage electrode 17, into the cold solvent flowing from enclosed space 14, past the tip of high voltage electrode 17 and through orifice 16. The flow velocity in the region of the high voltage electrode tip is relatively large, so as to sweep the injected charge downstream, away from the electrode tip. The stream of charged solvent exiting orifice 16 passes through a gas or vapor space 51, bounded by the walls of line 9, before impinging on the oil/solvent stream passing beneath the charge injector 10. In propane dewaxing, because liquified propane is a vaporizable liquid under the conditions of pressure and temperature prevailing in gas or vapor space 51, the space becomes filled with propane vapor which is vented through line 50, just below the underside of charge injector 10, to atmosphere or recycled to a propane recovery unit (not shown). Venting the propane vapor keeps the vapor space 51 substantially free of any air, so as to avoid risk of explosion or unwanted chemical reaction. Where a nonvaporizable solvent is used, such as hexane, a purge gas, for example nitrogen, may be circulated through gas space 51, in which case purge gas inlet and outlet pipes passing through the wall of line 9 would need to be provided just below the charge injector 10. The gas or vapor space 51 is important because it effectively electrically decouples the point of charge injection from the charged oil/solvent mixture in the centrifuge 2, having regard to the high velocity of the charged stream travelling through the space 51 and which exceeds the drift velocity of the injected charge carriers. This ensures much higher density of injected charge and therefore higher separation efficiency in the centrifuge. Further details of a charge injector which can be used for injecting charge into the cold solvent stream are given in the aforesaid Kelly U.S. Pat. No. 4,255,777.

In a modification, line 9 could be dispensed with entirely and charge injector 10 connected in line 3, so as to inject charge directly into the chilled waxy oil/solvent stream. The charged stream leaving the charge injector would have to pass through a gas or vapor space, and so the charge injector would need to be mounted in a section of the line 9 which is for example vertical. Furthermore, in this as in all other embodiments the upstream location of the charge injector relative to the centrifuge inlet should be as close to centrifuge inlet as possible, in order to minimize charge dissipation before the charged stream enters the centrifuge. However, the arrangement of a charge injector in line 3 is less desirable than that depicted in FIG. 1, because there may be a tendency for wax deposits to build up inside the charge injector which can then impair its performance. This potential problem is avoided when the free excess charge is injected into a separate cold solvent stream acting as a charge carrier because that solvent stream contains no wax.

Reverting to FIG. 1, the dewaxed oil and solvent withdrawn along line 8 from centrifuge 2 contains trace amounts of fine wax crystals, as already mentioned. In order to substantially remove these wax fines, the DWO and solvent stream in line 8 are fed to a charge injection bead separator 22. The bead separator is constructed substantially in accordance with the single figure of U.S. patent application Ser. No. 601,271 (Mintz et al), assigned to the present assignees, the contents of which are expressly incorporated herein by reference. However, the main elements of the bead separator will now be described. It comprises an upright cylindrical container vessel 23, having a base 24 and a cover 25. A charge injector 26 is mounted on the cover 25. This charge injector is similar in many respects to charge injector 10 and corresponding elements of charge injector 26 to those in charge injector 10 are denoted by the same reference numerals, apart from being larger by the value 100. As shown, charge injector 26 has an inlet 27 for admitting the DWO and solvent feed in line 8 to the internal chamber 114 in charge injector body 111. The container vessel is made of electrically insulative material and a grid electrode 33, positioned inside vessel 23 near the bottom and connected to earth 119 completes the electrical circuit of the charge injector 26. It is alternatively possible for container vessel 23 to be made of electrically conductive material and to be connected to earth 119. Free excess charge is injected by high voltage electrode 117 into the stream leaving chamber 114 through orifice 116, and the charged stream passes through a central circular opening 28 in cover 25 and also a gas or vapor space 29 in the upper region of the container vessel interior and pools on the surface of a quantity of charged DWO/solvent mixture in container vessel 23. The gas or vapor space 29 provides an analogous function to that of space 51 associated with charge injector 10 and therefore no further description is necessary.

As shown, most of the container vessel interior is occupied by a bed of densely packed beads 30 of low electrical conductivity whose exposed surfaces serve for the collection of charged wax fines. The beads suitably can be glass beads or beads made of ceramic material. The quantity of charged DWO/solvent mixture fills the interstitial spaces between the beads and preferably its level in the container vessel is just above the top level of the beads. Depending on the charging potential of the charge injector, the charged stream issuing from the charge injector 26 may be broken up into a spray before accumulating on the surface of the DWO/solvent mixture in the container vessel, but the existence of a charged spray or stream is immaterial to the operation of the bead separator. Clarified DWO and solvent in the lower regions of the bead separator are withdrawn through an outlet line 31 passing through the base 24 of the bead separator and leading to a solvent extraction unit (not shown) which extracts the solvent, leaving substantially wax and solvent-free lube oil. Solvent extraction units are well known in the art and need not be further described herein.

In the illustrated embodiment, the solvent is a vaporizable liquid, such as liquified propane, and accordingly the space 29 is filled with solvent vapor. This vapor is vented to atmosphere through vent hole 32. Alternatively, where a non-vaporizable solvent is used, a purge gas may be circulated through gas space 29, in which case purge gas inlet and outlet pipes passing through the container vessel wall would need to be provided in the upper region of the container vessel.

The operation of the dewaxing apparatus 1 will now be described, with reference to FIG. 1. Charged cold solvent in line 9 is added to the chilled waxy oil and solvent feed in line 3 and the combined feed is introduced through the axial inlet of centrifuge 2. In the centrifuge, the charge tends to transfer to the wax particles in the lube oil/solvent admixture while the wax particles are centrigued against the inside surface of the centrifuge bowl. Charged wax particles deposit on the centrifuge bowl and form a surface coating which acts as a charged wax collecting surface for further charged wax particles. This deposited wax is scraped from the bowl surface by the screw conveyor and, together with oil and solvent, is conveyed from the centrifuge by line 7. Meanwhile, a small proportion of wax fines in the centrifuge remains in suspension in the lube oil (DWO) and solvent, in the upper region of the centrifuge, which overflow the centrifuge weir and leave the centrifuge along line 87. Because the waxy lube oil and solvent admixture in the centrifuge 2 is charged, more effective wax separation is achieved for a given throughput than in the absence of the charge. Conversely, higher throughputs can be accommodated for the same level of trace amounts of wax in the DWO and solvent centrifuge overflow. In fact, even higher throughputs still can be accepted in the described embodiment because of the use of the bead separator 22 for removing wax fines from the DWO/solvent delivered from the centrifuge. This represents a considerable advance over conventional dewaxing centrifuges, in which throughput can be limited to such an extent, in order to keep trace amounts of wax crystal fines in the DWO and solvent outlet flow from the centrifuge to an acceptably low level, as to be relatively uneconomical.

The DWO and solvent feed in line 8, containing small traces of wax fines, passes through the charge injector 26 of the bead separator 22, in which it becomes charged and is then directed onto the quantity of DWO and solvent in container vessel 23, on which it accumulates. The level of DWO and solvent in the container vessel is kept substantially constant, just covering the beads 30, either by equating the input and output flow rates to and from the bed separator, or in any other suitable way such as by means of a level sensor operating a valve in line 8 or outlet line 31 or in both lines. Injected charge transfers to the wax fines in the container vessel 23 and at the same time sets up an induced electric field within the DWO/solvent mixture in the vessel. The field and charge on the wax fines interact electrophoretically and thereby set up motion or migration of the individual wax fines within the continuous DWO/solvent phase. The migrating fines each soon encounter, on a statistical basis, a neighbouring bead and they thereby deposit on the beads. Most of the wax is removed from the DWO/solvent in the upper port of the packed bed and the beads are progressively less wax-fouled at increasing depths within the container vessel. The DWO and solvent in the bottom of the vessel 23 are substantially wax fine free and they are withdrawn from the container vessel along line 31.

It will be appreciated that after prolonged operation, substantial deposits of wax will build up in the bead separator and these tend to detract from the efficiency of the bead separator. Accordingly, the beads should periodically be either replaced, cleaned or regenerated. Various such techniques for this purpose are well known in the art and need not be described herein. However, a preferred arrangement (not shown) comprises two bead separators connected in parallel. When either of the bead separators becomes excessively fouled with collected wax, it can be disconnected from line 8, by closing off a suitable flow control valve while the other bead separator treats the DWO and solvent from the centrifuge. Hot wax solvent is then flushed through the out-of-service bead separator to dissolve the wax fouling and thereby regenerate the beads, after which the bead separator can be reconnected to line 8.

According to a modification (not shown), the bead separator 22 could be connected in line 3, so as to remove wax from the chilled waxy oil and solvent feed to centrifuge 2, instead of in line 8 as illustrated in FIG. 1. In this modification, use of the charge injector 10 in addition to the bead separator may or may not be necessary, according to whether the bead separator and centrifuge together are able to achieve a sufficient reduction or degree of elimination of wax content in the DWO and solvent discharged from the centrifuge without charge injector 10. Of course, it would be possible to incorporate two bead separators into the wax separating apparatus, one in the feed line 3 and one in line 8, with or without the charge injector 10.

It is further remarked that the use of a solvent to facilitate the precipitation of dissolved wax is preferred, but not essential. Furthermore, cooling of the waxy lube oil before it is introduced into the centrifuge will not be necessary where the lube oil temperature is already low enough such that the wax contained in the lube oil is already present as a suspension of dispersed wax particles or crystals. In addition, it is not essential both that the chilled waxy oil and solvent feed be charged and also that the DWO and solvent from the centrifuge be treated by charge injection, for further removal of wax. Such an arrangement is preferred for the reasons explained above, but the bead separator is unnecessary, providing the throughput in the centrifuge is kept below a limit commensurate with a pre-specified maximum wax fines content in the DWO/solution admixture. Conversely, the addition of the cold charged solvent to the feed to the centrifuge can be dispensed with, in which case the bead separator serves to reduce the quantity of trace amounts of wax fines in the DWO/solvent from the centrifuge to below the maximum specified level. It is also mentioned that the bead separator could be replaced by any other kind of wax removal unit employing charge injection or other means of introducing free excess charge. In one category, the wax removal unit includes one or more collector surfaces, of which packed beads is an example, which are positioned in the path of the migrating wax particles or fines and on which the wax particles or fines deposit and agglomerate. In another category, migrating wax particles or fines are allowed to agglomerate with other wax particles or fines while still within the body of a quantity of DWO and solvent in a separation vessel and the agglomerates are collected and separated in any suitable way, for example by settling or mechanical filtration. Reference is directed to U.S. patent application Ser. Nos. 722,107, 722,160, 722,162, and 722,163, all filed on the same day as the present application and assigned to the present assignees, the contents of which are hereby expressly incorporated herein, for respective disclosures of various forms of charge injection wax separators from both categories mentioned above. Reference is also directed to application Ser. No. 601,271 filed Apr. 17, 1984, and assigned to the present assignee.

As an alternative to a separator connected in the feed line to the centrifuge inlet, an electrical treater may be used which produces wax agglomerates and grown wax particles in a treatment vessel in exactly the same way as the separator referred to in the preceding paragraph but, instead of separating these agglomerates and particles, they are left in the oil/solvent feed to the centrifuge inlet. However, because the wax particles and agglomerates are enlarged in size as compared with their original untreated size, they will be more effectively separated in the centrifuge.

The description of the present specification refers throughout to the removal of wax from lubricating oil, which is a preferred application of the invention. It will of course be recognised that the invention is not selective for removing only wax from lubricating oil, but will also be effective for separating other contaminant particles such as grit, catalyst fines, asphaltene particles, oxide scale, corrosion scale and other corrosion products, coke fines and the like which may also be present with the wax either singularly or in some combination. Further, whilst the preferred application of the present invention is the removal of wax from lube oil, it will be appreciated that the invention finds application, generally, to separating dispersed solid or liquid phases from continuous liquid phases. In the case of dispersed liquid phases, centrifuges for separating two liquids of different densities from one another are well known and could be used, in conjunction with charge injection or other techniques of introducing free excess charge, in a similar manner to that described herein. Charge injection into the feed to the centrifuge would enhance agglomeration of the dispersed liquid phase in the centrifuge and the downstream separator could, for example, employ a bed of packed beads to promote coalescence of charged liquid droplets followed by settling to separate the dispersed phase from the continuous phase.

Finally, it will be understood that the foregoing disclosure and description are only illustrative and explanatory of the invention. Various changes in and modifications to the components of the inventive apparatus and methods, as well as in the details of the illustrated apparatus and of the disclosed processes, may be made within the scope of the appended claims without departing from the spirit of the invention.

What is claimed is:

1. A method of separating a dispersed phase from a continuous liquid phase, wherein the continuous phase is centrifuged in a centrifugal separation device, for separating a quantity of dispersed phase from the continuous phase, free excess charge which is net unipolar is introduced into the continuous phase, whereby charge transfers to dispersed phase in the continuous phase, and wherein charged dispersed phase is collected, for separation from the continuous phase.

2. A method as claimed in claim 1, wherein the free excess charge is introduced into the continuous phase so that the continuous phase which is centrifuged contains charged dispersed pahse, whereby charged dispersed phase is collected on internal surface areas of the centrifugal separation device.

3. A method as claimed in claim 2, wherein charged dispersed phase agglomeration and growth within the continuous phase are allowed to occur before the continuous phase is centrifuged.

4. A method as claimed in claim 3, wherein the charged dispersed phase is collected by bringing said continuous phase remaining after said quantity of dispersed phase has been separated from the continuous phase by the centrifugal separation device, and at least one collector surface for dispersed phase into contact with one another so that charged dispersed phase deposits on said collector surface(s).

5. A method as claimed in claim 4, wherein said continuous phase remaining after said quantity of dispersed phase has been separated from the continuous phase by the centrifugal separation device is passed through a bed of densely packed beads of low electrical conductivity whose exposed surfaces act as collector surfaces for charged dispersed phase.

6. A method as claimed in claim 1, wherein, prior to centrifuging the continuous phase, the free excess charge is introduced into the continuous phase, whereby charge transfers to the dispersed phase, and charged dispersed phase is collected and separated from the continuous phase, before that continuous phase is centrifuged.

7. A method as claimed in claim 6, wherein charged dispersed phase is collected and separated from the continuous phase by bringing the continuous phase into which free excess change has been introduced and at least one collector surface for dispersed phase into contact with one another so that charged dispersed phase deposits on said collector surfaces.

8. A method of treating a hydrocarbon oil mixture boiling in the lubricating oil range and containing wax particles, for separating wax particles from the oil mixture, comprising the steps of:
centrifuging the oil mixture to be treated in a centrifugal separation device, for separating a quantity of the wax particles from the oil mixture;
introducing free excess charge which is net unipolar into the oil mixture, whereby charge transfers to wax particles in the oil mixture; and
collecting charged wax particles, for separation from the oil mixture.

9. A method as claimed in claim 8, wherein the free excess charge is introduced into the oil mixture remaining after said quantity of wax particles has been separated from the oil mixture by the centrifugal separation device, which remaining oil mixture contains further wax particles to which said charge transfers, and charged wax particles are collected separately of the centrifugal separation device.

10. A method as claimed in claim 9, wherein the free excess charge is introduced by charge injection into a stream of said remaining oil mixture and said charged stream is passed through a gas or vapor space for electrically decoupling the collection of the charged wax particles from where the charge injection takes place.

11. method as claimed in claim 8, wherein the free excess charge is introduced into the oil mixture so that the centrifuged oil mixture is charged, whereby wax particles are collected on internal surface areas of the centrifugal separation device.

12. A method as claimed in claim 11, wherein the oil mixture remaining after said quantity of wax particles has been separated by the centrifugal separating device contains further wax particles and further free excess charge which is net unipolar is introduced into said remaining oil mixture whereby charge transfers to wax particles in said remaining oil mixture, and wherein such charged wax particles are collected, for separation from the oil mixture.

13. A method as claimed in claim 11, wherein the charge is introduced in each case by charge injection.

14. A method as claimed in claim 13, wherein said remaining oil mixture, after being charged, and at least one collector surface for wax are brought into contact with one another so that the wax in said remaining oil mixture is collected on said collector surface(s).

15. A method as claimed in claim 13, wherein said remaining oil mixture, after being charged, is passed through a bed of densely packed beads of low electrical conductivity so that wax in said remaining oil mixture accumulates is collected by said bed.

16. A method as claimed in claim 8, wherein an oil solvent is added to the oil mixture to be treated.

17. A method as claimed in claim 16, wherein said oil solvent is a vaporizable liquid which is allowed to vaporize to induce self-cooling for enhancing the precipitation of any dissolved wax.

18. A mehtod as claimed in claim 16, wherein the free excess charge is introduced by injecting charge into said oil solvent, before that solvent is added to the oil mixture to be treated.

19. A method as claimed in claim 8, wherein the oil mixture to be treated is cooled to promote precipitation of any dissolved wax in the oil mixture as wax particles.

20. Apparatus for separating a dispersed phase from a continuous liquid phase, comprising a centrifugal separation device for separating a quantity of dispersed phase from the continuous phase, means for introducing free excess charge which is net unipolar into the continuous phase, whereby charge transfers to dispersed phase in the continuous phase, and means for collecting charged dispersed phase, for separation from the continuous phase.

21. Apparatus according to claim 20, wherein the charge introducing means is arranged for introducing free excess charge into the continuous phase remaining after said quantity of dispersed phase has been separated from the continuous phase by the centrifugal separation device.

22. Apparatus as claimed in claim 21, wherein the collecting means comprises a bed of densely packed beads of low electrical conductivity through which, in use, said remaining continuous phase, charged by the charge introducing means, is passed.

23. Apparatus according to claim 20, wherein the charge introducing means is arranged to introduce free excess charge into the continuous phase in such manner that introduced charge transfers to the dispersed phase in the continuous phase which is subjected to centrifugation in the centrifugal separation device, and wherein the collecting means comprises internal collector surface areas of the centrifugal separation device.

24. Apparatus as claimed in claim 23, wherein a treatment vessel associated with the charge introducing means is provided for allowing charged dispersed phase to agglomerate and grow within the continuous phase in the separation vessel, before the continuous phase is admitted to the centrifugal separation device.

25. Apparatus for separating a dispersed phase from a continuous liquid phase, comprising means for introducing free excess charge which is net unipolar into the continuous phase, whereby charge transfer to dispersed phase in the continuous phase, and a centrifugal separation device for separating a quantity of the dispersed phase from the continuous phase from the charge introducing means, the charge transfer assisting the separation of the dispersed phase from the continuous phase in the centrifugal separation device.

26. Apparatus for treating a hydrocarbon oil mixture boiling in the lubricating oil range and containing wax particles, for separating wax particles from the oil mixture, comprising means for introducing free excess charge which is net unipolar into the oil mixture, whereby charge transfers to wax in the oil mixture, and a centrifugal separation device for separating a quantity of wax from the oil mixture from the charge introducing means, the charge transfer assisting the separation of wax from the oil mixture in the centrifugal separation device.

27. Apparatus as claimed in claim 26, wherein the charge introducing means comprises a charge injector.

28. Apparatus as claimed in claim 27, wherein means are provided for cooling the oil mixture before it is subjected to centrifugation in the centrifugal separation device, in order to promote the precipitation of any dissolved wax in the oil mixture.

29. Apparatus as claimed in claim 28, wherein the cooling means comprises a heat exchange between said oil mixture and a cooling medium.

30. Apparatus as claimed in claim 28, wherein said cooling means comprises means for adding a vaporizable oil solvent to the oil mixture, before it is admitted to the centrifugal separation device, which vaporizable liquid is allowed to vaporize to induce at least part of the cooling of the oil mixture.

31. Apparatus for treating a hydrocarbon oil mixture boiling in the lubricating oil range and containing wax particles, for separating wax particles from the oil mixture, comprising a centrifugal separation device for separating a quantity of wax from the oil mixture, means for introducing free excess charge which is net unipolar into the oil mixture remaining after said quantity of wax has been separated, in the centrifugal separation device, from the oil mixture to be treated, and a separator, including at least one collector surface, for receiving oil mixture from the charge introducing means and for collecting charged wax in the received oil mixture on said collector surface(s).

32. Apparatus as claimed in claim 31, wherein the charge introducing means comprises a charge injector.

33. Apparatus as claimed in claim 32, wherein the charge injector is arranged to inject said charge into a stream of said remaining oil mixture which is passed through a gas or vapor space defined by a chamber for electrically decoupling the collection of the charged wax on said collector surface(s) from where the charge injection takes place.

34. Apparatus as claimed in claim 31, wherein said separator comprises a container vessel having an inlet and an outlet and a bed of densely packed beads of low electrical conductivity between said inlet and said outlet, said beads providing said collector surfaces.

35. Apparatus as claimed in claim 31, wherein means are provided for cooling the oil mixture before it is subjected to centrifugation in the centrifugal separation device, in order to promote the precipitation of any dissolved wax in the oil mixture.

36. Apparatus as claimed in claim 35, wherein means are provided for adding an oil solvent to the oil mixture to be treated, to enhance precipitation of any dissolved wax in the oil mixture.

37. Apparatus for treating a hydrocarbon oil mixture boiling in the lubricating oil range and containing wax particles, for separating wax particles from the oil mixture, comprising first means for introducing free excess charge which is net unipolar into the oil mixture, whereby charge transfers to wax in the oil mixture, a centrifugal separation device for separating a quantity of wax from the oil mixture from the charge introducing means, the charge transfer assisting the separation of wax from the oil mixture in the centrifugal separation device, second means for introducing free excess charge which is net unipolar into the oil mixture remaining after said quantity of wax has been separated, in the centrifugal separation device, from the oil mixture to be treated, whereby charge transfers to wax in said remaining oil mixture, and a separator, including at least one collector surface, for receiving oil mixture from the second charge introducing means and for collecting charged wax in the received oil mixture on said collector surface(s).

38. Apparatus as claimed in claim 37, wherein the means for collecting charged dispersed phase is provided with a grounded electrode which is positioned so as to be in electrical contact with charged dispersed phase in the continuous phase.

* * * * *